United States Patent
Faris et al.

(10) Patent No.: US 6,653,405 B2
(45) Date of Patent: Nov. 25, 2003

(54) HIGH HEAT DISTORTION TEMPERATURE METHACRYLATE POLYMER BLENDS

(75) Inventors: Tom V. Faris, Pataskala, OH (US); Greg T. Gordon, Columbus, OH (US); David T. Chan, Columbus, OH (US)

(73) Assignee: Plaskolite, Inc., Columbus, OH (US)

( * ) Notice: Subject to any disclaimer, the term of this patent is extended or adjusted under 35 U.S.C. 154(b) by 0 days.

(21) Appl. No.: 10/126,749

(22) Filed: Apr. 22, 2002

(65) Prior Publication Data

US 2003/0004271 A1 Jan. 2, 2003

Related U.S. Application Data

(60) Provisional application No. 60/284,875, filed on Apr. 20, 2001, and provisional application No. 60/284,876, filed on Apr. 20, 2001.

(51) Int. Cl.[7] .......................... C08L 23/00; C08L 33/12; C08F 8/00; C08F 20/14; C08F 20/18
(52) U.S. Cl. ...................... 525/191; 525/240; 525/222
(58) Field of Search ............................... 525/191, 240, 525/222

(56) References Cited

U.S. PATENT DOCUMENTS

| | | | |
|---|---|---|---|
| 4,754,008 A | 6/1988 | Siol et al. ................... 526/224 |
| 5,073,615 A | 12/1991 | Shen ........................... 526/262 |
| 5,202,381 A | * 4/1993 | Parker .......................... 525/85 |
| 5,328,962 A | 7/1994 | Shen ........................... 525/228 |
| 5,378,758 A | * 1/1995 | Amici et al. .................. 525/57 |

FOREIGN PATENT DOCUMENTS

| | | |
|---|---|---|
| JP | 6060108 | 4/1985 |
| JP | 6060109 | 4/1985 |
| JP | 6081207 | 5/1985 |
| JP | 6086102 | 5/1985 |

* cited by examiner

*Primary Examiner*—Nathan M. Nutter
(74) *Attorney, Agent, or Firm*—Connolly, Bove, Lodge & Hutz, LLP; Thomas R. Boland

(57) ABSTRACT

An acrylate ester polymer composition having the desirable optical properties of poly(meth)acrylates and an enhanced Tg comprises a blend of a conventional PMMA polymer or copolymer with a high Tg acrylate ester polymer prepared by pyrolyzing a copolymer of methyl methacrylate and t-butyl methacrylate. The blend exhibits a single Tg, intermediate between the Tg of the conventional PMMA polymer and that of the pyrolyzed methyl methacrylate/t-butyl methacrylate copolymer. The blend can be formed into products that have good clarity, low haze and low color.

14 Claims, No Drawings

HIGH HEAT DISTORTION TEMPERATURE METHACRYLATE POLYMER BLENDS

RELATIONSHIP TO OTHER APPLICATIONS

This application claims the benefit of copending U.S. Provisional Patent Application No. 60/284,875, filed Apr. 20, 2001, the entire disclosure of which is incorporated herein by reference, and of copending U.S. Provisional Patent Application No. 60/284,876, filed Apr. 20, 2001, the entire disclosure of which is incorporated herein by reference.

BACKGROUND OF THE INVENTION

1. Field of the Invention

This invention relates to blends of acrylate polymers and more particularly to acrylate polymer blends having a high heat distortion temperature and to ingredients for preparing such blends.

2. Brief Description of the Prior Art

Polymers of acrylate and methacrylate esters have come to be used widely in applications wherein optical clarity is a highly desired property. They are readily prepared in sheets of various thicknesses and can be formed at elevated temperatures into shapes that are useful as housings for lamps and the like.

However, their relatively low glass transition temperature causes them to soften and lose strength at relatively low temperatures and thus limits their use for applications in which they may be subjected to temperatures above their heat distortion temperature.

Among the acrylate ester polymers, poly(methyl methacrylate) (PMMA) is the material most widely used for glazing, clear transparent housings, and the like. Although poly(methyl methacrylate) is well known for its excellent weathering, clarity and resistance to ultraviolet light, it suffers from a relatively low softening point (85° C. to 105° C.), especially when compared to Bisphenol A polycarbonate resins, which have a softening point in the range of 135° C. to 150° C. Because of its lower softening point, PMMA is limited in its applications where high temperature is involved, e.g., lamp housings and the like. Consequently, designers cannot take advantage of the other appealing characteristics of PMMA, such as clarity and UV resistance. Given the relatively low thermal performance of typical PMMA polymers and even lower thermal performance of impact modified acrylic polymers, some attempts have been made to tailor the thermal performance of either polymer to a specific range, preferably while maintaining the high light transmission and UV resistance of the base PMMA polymer.

Typically, for random copolymers the polarity and the stiffness of the polymer chain is the average of the values for the individual respective homopolymers. (Rodriguez, F.; Principles of Polymer Systems; Hemisphere Publishing; New York; 1989; pp 49). Gordon and Taylor developed an empirical relationship in terms of the weight fraction of each monomer and the respective Tg's of each homopolymer:

$$1/Tg(\text{copolymer}) = w_1/Tg_1 + w_2/Tg_2$$

U.S. Pat. No. 4,754,008, to Siol et al. discloses copolymers of a-methyl styrene and methyl methacrylate (MMA) with a Tg in the range of 130° C. to 150° C. prepared using this approach. Although these copolymers exhibit a very high Tg, they are somewhat difficult to produce due to conversion rate limitations, which require very specific production methods.

Another approach that has been employed to achieve high Tg acrylate ester polymers is the co-polymerization of N-substituted maleimides to stiffen the backbone of the polymer chain, as disclosed in U.S. Pat. No. 5,073,615, to Shen et al. This results in high Tg polymers but is of limited utility because of the low co-polymerization constants of typical maleimides (e.g., N-phenyl maleimide having copolymerizaton constants with MMA of $r1^{MMA} = 1.014$; $r2 = 0.164$). Considering these values, a feed ratio of almost 30 mol % of the maleimide would be required to obtain a copolymer with 5.0 mol % N-phenyl maleimide in the polymer chain. As a consequence of this and the fact that maleimides will not homopolymerize, large amounts of unreacted N-substituted maleimides would be expected to remain at the end of the polymerization.

Nevertheless, U.S. Pat. No. 5,328,962, to Shen et al., discloses blending a high heat resistant acrylic polymer that is a copolymer of methyl methacrylate (MMA) with N-alkyl-substituted maleimides, with PMMA to yield clear materials having good optical transmittance and an elevated softening temperature. The blends may also incorporate conventional impact modifiers to yield clear samples having superior impact strength compared to normal PMMA. Shen's examples exhibited a single Tg and were clear with little or no haze. However, as indicated above, preparation of the copolymers incorporating N-substituted maleimides presents certain problems in obtaining materials with low residual maleimide content.

Accordingly, a need has continued to exist for a thermoplastic material having the clarity, weather-resistance, and good processing characteristics of PMMA but having a higher heat distortion temperature.

SUMMARY OF THE INVENTION

The problem of providing an acrylate ester polymer having excellent optical and weather resistant properties together with a relatively high heat distortion temperature has now been alleviated by the polymer blends of this invention comprising 1) from about 95% by weight to about 50% by weight of a poly(methyl methacrylate) based polymer comprising
   (a) from about 80% by weight to 100% by weight of methyl methacrylate, and
   (b) from about 0% by weight to about 20 weight % of a copolymerizable free-radical polymerizable comonomer,
2) from about 5% by weight to about 50% by weight of a copolymer prepared by polymerizing a monomer mixture comprising
   (a) from about 50% by weight to about 95% by weight of methyl methacrylate,
   (b) from about 5% by weight to about 30% by weight of t-butyl methacrylate, and
   (c) from about 0% by weight to about 20% by weight of a copolymerizable lower (meth)acrylate ester monomer; and
   preparing a pyrolyzed copolymer by pyrolyzing the resulting copolymer at a temperature of from about 150° C. to about 320° C. for a period of from about 10 seconds to about 10 hours, said pyrolyzed copolymer having a refractive index compatible with that of said poly(methyl methacrylate based copolymer;
3) from about 0% by weight to about 50% by weight of an refractive index compatible impact modifier polymer material.

from about 95% by weight to about 50% by weight of a poly(methyl methacrylate) based polymer comprising from about 80 weight % methyl methacrylate and from about 0% by weight to about 20 weight % of copolymerizable free-radical polymerizable comonomer, from about 5% by weight to about 50% by weight of a copolymer prepared by polymerizing a monomer mixture Accordingly, it is an object of the invention to provide a blend of acrylic ester polymers and/or copolymers.

A further object is to provide a blend of acrylic ester polymers and/or copolymers having a high heat distortion temperature.

A further object is to provide a blend of acrylic ester polymers and/or copolymers having a high glass transition temperature (Tg).

A further object is to provide a blend of acrylic ester polymers and/or copolymers having a heat distortion temperature higher than that of a poly(methyl methacrylate) polymer.

A further object is to provide a blend of acrylic ester polymers and/or copolymers having a glass transition temperature (Tg) higher than that of a poly(methyl methacrylate) polymer.

A further object is to provide a copolymer of methyl methacrylate and t-butyl methacrylate.

A further object is to provide a copolymer of methyl methacrylate and t-butyl methacrylate that has been pyrolyzed to provide a copolymer having an increased glass transition temperature.

A further object is to provide an acrylic ester copolymer that can be blended with poly(methyl methacrylate) to provide a clear plastic material having an increased heat distortion temperature.

A further object is to provide a copolymer of methyl methacrylate and t-butyl methacrylate that has been pyrolyzed to provide a copolymer having an increased glass transition temperature.

A further object is to provide a copolymer of methyl methacrylate and t-butyl methacrylate that has been pyrolyzed to provide a copolymer having an increased glass transition temperature and can be blended with poly(methyl methacrylate) to provide a clear plastic material having an increased heat distortion temperature.

Further objects of the invention will be apparent from the description of the invention which follows.

DETAILED DESCRIPTION OF THE INVENTION AND PREFERRED EMBODIMENTS

According to the invention, an acrylate/methacrylate copolymer that exhibits a heat distortion temperature 5° C. to 30° C. higher than conventional PMMA is blended at various ratios with a conventional polymer of methyl methacrylate or copolymer thereof to provide a polymer blend having a Tg intermediate between conventional PMMA and the high heat methacrylate while retaining the desirable properties of PMMA such as clarity, weather resistance, and the like. The high Tg methacrylate copolymer is a copolymer of methyl methacrylate, t-butyl methacrylate, and, optionally, from about 0% by weight to about 5% by weight of a copolymerizable lower (meth)acrylate ester comonomer.

The high heat distortion temperature (high Tg) methacrylate copolymers used as blending materials in the high heat distortion acrylate polymer blends of the invention have high glass transition temperatures, 115° C. to 130° C. (measured on $2^{nd}$ heat history 10° C./min to 150° C. after heating to 150° C. and quenching to 30° C.) with the use of substantially acrylate and methacrylate monomers. The polymers are easily polymerized by conventional bulk polymerization in reasonable times. These polymers are also clear and hard with no appreciable haze. In the discussion herein, the Tg is taken, as is conventional, as an indication of the heat distortion temperature of a polymer or blend of polymers.

The high Tg methacrylate copolymers used as blending materials in preparing the high Tg polymer blends of the invention are readily prepared by conventional free-radical polymerization techniques. The polymers are prepared by polymerizing a monomer mixture containing (a) from about 50% by weight to about 95% by weight of methyl methacrylate, (b) from about 5% by weight to about 20% by weight of t-butyl methacrylate, (c) from about 0% by weight to about 5% by weight of a copolymerizable lower (meth)acrylate ester monomer, by conventional free-radical polymerization procedures.

According to a typical procedure, a mixture of copolymerizable monomers is mixed with a suitable free-radical polymerization initiator and typically heated for a period of time which may range from a few seconds to several hours depending on the reactivity of the monomers, the initiator used, and the temperature at which the reaction is conducted. Bulk polymerization, solution polymerization, suspension polymerization, or the like procedures can be used. Such procedures are well-known to those skilled in the art, and the skilled practitioner will adapt the conditions to the mixture of monomers that is being polymerized. After polymerization has been carried to practical completion, the polymer is recovered, purified if necessary, and subjected to a heating step wherein isobutylene is evolved by thermal decomposition of the t-butyl methacrylate residues in the polymer chain. The heating step is carried out at a temperature of from about 150° C. to about 320° C. for a period of time ranging from about 10 seconds to about 10 hours, depending on the temperature of the pyrolysis and the proportion of t-butyl methacrylate residues in the polymer. During the pyrolysis the t-butyl methacrylate residue are decomposed and release isobutylene in the gaseous state. The isobutylene may diffuse from the polymer material or remain therein to produce a foam. As the t-butyl methacrylate residues are pyrolyzed the Tg of the remaining polymer increases. Accordingly, any amount of pyrolysis, i.e., any amount of release of isobutylene, will produce a resulting polymer having a higher Tg than the initial polymer. The degree of pyrolysis is conveniently determined by measuring the loss in weight of the pyrolyzed material, and the remaining amount of t-butyl methacrylate residues is conveniently defined as the "residual isobutylene", i.e., the remaining amount of isobutylene that would be released if all the t-butyl methacrylate groups were pyrolyzed. It is preferred to carry out the pyrolysis for a period of time sufficient to pyrolyze substantially all of the t-butyl methacrylate residues in the starting copolymer, i.e., until the residual isobutylene therein is less than about 1.5% by weight. Most preferably, the residual isobutylene content is reduced to the smallest amount possible. The residual isobutylene content may be measured by any appropriate method; it is conveniently measured by determining the loss in weight of the polymer upon pyrolysis. The pyrolyzing step is conducted by simply heating the initial polymer to the desired temperature and holding it at that temperature until the predetermined desirable level of residual isobutylene is achieved. The heating may be carried out in any conventional oven or other appropriate heating device at atmospheric pressure or under vacuum. A preferred method of pyrolyzing or devolatilizing the initial acrylate ester copolymer is by passing the copolymer through an extruder at an appropriate temperature, whereby the polymer may be devolatilized and the extruded material may be immediately conveniently cooled and pelletized.

It is believed that the resultant pyrolyzed, i.e., devolatilized, polymer may contain glutaric anhydride residues formed by intra-chain reaction of the methacrylic acid formed by decomposition of the t-butyl esters with neighboring methyl methacrylate residues. The resulting pyrolyzed polymer may also be characterized by a high proportion of syndiotactically oriented methacrylate repeat units. The pyrolyzed (devolatilized) copolymer is characterized by a high Tg and good compatibility with conventional PMMA polymers and copolymers. Accordingly, the pyrolyzed high Tg (meth)acrylate ester copolymer is capable of being blended with conventional PMMA polymers and copolymers to yield a polymer blend that retains the optical, strength, weather resistance, and like properties of acrylate ester polymers, but has a significantly higher Tg or heat distortion temperature. Accordingly the polymer blend are useful in applications where the optical properties of (meth)acrylate ester polymers are desired, but a greater heat resistance is required.

The high Tg polymer so prepared may be blended with conventional PMMA-based polymers to increase the Tg of the blend. Typical PMMA based polymers are those containing from about 80% by weight to 100% by weight of methyl methacrylate and from about 0% by weight to about 20% by weight of a copolymerizable free-radical polymerizable comonomer. Typical PMMA-base polymers useful as the base polymers in the blends of this invention are those containing about 95% by weight of PMMA and about 5% by weight of ethyl acrylate (EA).

The impact modifying polymers used as the optional third ingredient of the polymer blends of the invention may be any conventional impact modifier having a refractive index compatible with the base PMMA polymer and the high Tg polymer blended therewith. Such materials are well known and include, for example, core-shell polymers comprising minute particles having a core of a rubbery polymer and a shell of a (meth)acrylate ester compatible with the PMMA base polymer, as well as butadiene-based rubber materials formulated to have a refractive index close to that of the base polymer in order to minimize haze produced in the impact-modified polymer blend. Any such materials can be used as the impact modifier in the blends of the invention provided only that the refractive index of the selected impact modifier is chosen to provide an acceptable level of haze in the resulting polymer blend.

The polymer blends of the invention can be produced by any conventional blending procedure. For, example pellets of the ingredient polymers can be mixed in a mixer at a temperature high enough to produce a uniform blend of polymers. A particularly convenient blending procedure is to introduce pellets or the like of the ingredient polymers into the input feed of an injection molding apparatus where they are mixed and melted together immediately prior to being introduced into a mold. A preferred method of producing the polymer blends of the invention is to introduce pellets or the like of the base PMMA polymer, the MMA-TBMA copolyer prior to pyrolysis, and, optionally, any impact modifiers, into an extrusion apparatus and mix and heat the materials at a temperature high enough to produce pyrolysis of the MMA-TBMA polymer as the blended material is fed through the extrusion apparatus and out through a suitable die. The extrusion apparatus is provided with evacuation means for removing the isobutylene generated by the pyrolysis of the MMA-TBMA copolymer. In the ideal case the pyrolysis and extrusion is continued until all the MMA-TBMA copolymer has been pyrolyzed, leaving no residual t-butyl methacrylate that will be pyrolyzed to release isobutylene. The course of the pyrolysis can be monitored by measuring the amount of isobutylene released as indicated by the loss in weight of the blended mixture. Preferably, the pyrolysis is continued until no more than about 1.5% of removable isobutylene remains in the blend, i.e., until about 98.5% or more of the isobutylene that can be liberated by pyrolysis has been removed. After pyrolysis, the polymer blend can be pelletized and used to produce molded, extruded, or other shaped articles by conventional procedures. Such pyrolysis and extrusion procedures are conventional, and the choice of appropriate equipment and operating conditions is within the skill of the ordinary practitioner in this art.

The polymer blends of the invention are useful in producing clear acrylate material having a Tg greater than that of the base PMMA polymer, which are therefore useful in circumstances wherein conventional (meth)acrylate polymers are subject to distortion due to a high-temperature environment. Such uses a lenses and covers for lighting equipment, e.g., luminaires, and the like, are appropriate for the polymer blends of the invention. Because the polymer blends of the invention are made of acrylate esters only, and materials that are compatible with acrylate ester polymers, they are more convenient to recycle, e.g., by grinding and incorporating into second-generation acrylate ester articles wherein a high heat distortion temperature is desirable. This advantage is not possessed by other clear synthetic polymers having a high heat distortion temperature, e.g., polycarbonates, which are incompatible with acrylate ester polymers and cannot be blended with them to produce clear materials.

The preparation of the high Tg methacrylate copolymers and blends thereof with conventional (meth)acrylate polymers and copolymers is illustrated by the following examples, which are not intended to limit the scope of the invention in any way, the scope of the invention being defined by the appended claims.

EXAMPLE 1

This example illustrates the preparation of certain high Tg methacrylate copolymers useful in preparing the (meth)acrylate polymer blends of the invention by bulk polymerization.

An amount of methyl methacrylate monomer (MMA) weighing 407.87 grams was added to a stirred reaction vessel containing 68.14 grams of t-butyl methacrylate (TBMA) and 23.99 grams of ethyl acrylate (EA). A mercaptan chain transfer agent, n-dodecyl mercaptan (1.75 grams), was added followed by t-butyl perpivalate at approximately 75 ppm based on total weight. This monomer mixture was purged with helium for 2 minutes at 22° C., placed into a nylon 6 oven bag, and placed into an oven held at 65° C. and allowed to react until a solid clear polymer was obtained.

This polymer sample was then dissolved in tetrahydrofuran and precipitated into a methanol and water solution. The wet polymer was collected and dried at 65° C. under vacuum to remove any vestiges of monomer or THF solvent. The resulting glass transition temperature was measured using a TA Instruments DSC 10 heated at 10° C. per minute to 150° C. The sample was heated to 150° C., quenched to 30° C.

and the Tg measured on the second heat history. The proportions of ingredients and the resulting Tg are reported as Experiment #3 in Table 1 below. Copolymers were prepared by the same procedure using different proportions of ingredients, and the results are summarized in Table 1.

TABLE 1

| Experiment # | mol % EA | mol % TBMA | mol % MMA | Tg (° C.) 1 | Tg (° C.) 2 |
|---|---|---|---|---|---|
| 1 | 5.00 | 0.00 | 95.00 | 104.99 | 108.2 |
| 2 | 5.00 | 5.00 | 90.00 | 114.98 | 119.09 |
| 3 | 5.00 | 10.00 | 85.00 | 121.30 | 123.39 |
| 4 | 5.00 | 15.00 | 80.00 | 116.98 | 127.73 |
| 5 | 5.00 | 20.00 | 75.00 | 113.75 | 129.18 |
| 6 | 5.00 | 25.00 | 70.00 | 110.30 | 133.87 |
| 7 | 5.00 | 30.00 | 65.00 | 101.12 | 136.42 |

Tg 1 - the glass transition taken prior to pyrolysis
Tg 2 - the glass transition taken subsequent to pyrolysis

EXAMPLE 2

This example illustrates the preparation of certain high Tg methacrylate copolymers useful in preparing the (meth)acrylate polymer blends of the invention by solution polymerization.

Tertiary butyl methacrylate (2.065 grams)(TBMA) was added to a glass bottle containing 0.4847 grams ethyl acrylate (EA), 0.4847 grams maleic anhydride (MAH) and 16.9656 grams of methyl methacrylate monomer (MMA). This mixture was stirred until all of the maleic anhydride had dissolved and then diluted to 50.0 weight percent solids using 1,4-dioxane. A free radical polymerization initiator, t-butyl perpivalate (0.50 grams), was added and the reaction mixture purged for 30 seconds with helium to remove dissolved oxygen from the reaction mix. The bottle was then sealed and placed into a laboratory oven held at 65° C. for 3 hours. The sample bottle was then removed from the oven and cooled to room temperature, and the polymer precipitated into a methanol and water solution. The wet polymer was collected and dried for 12 hours at 120° C. to remove all solvent, water and residual monomers. The proportions of ingredients and the resulting Tg are reported as Experiment 7-1 in Table 2 below. Copolymers were prepared by the same procedure using different proportions of ingredients, and the results are summarized in Table 2.

The glass transition temperatures, which resulted from this series of experiment for both the pyrolyzed and unpyrolyzed samples, are detailed in Table 4.

TABLE 2

| Exp # | mol % TBMA | mol % EA | mol % MAH | mol % MMA | Tg (° C.) | Tg (° C.) |
|---|---|---|---|---|---|---|
| 7-1 | 7.50 | 2.50 | 2.50 | 87.50 | 113.86 | 118.34 |
| 1-1 | 7.50 | 5.00 | 5.00 | 82.50 | 113.02 | 116.97 |
| 5-1 | 15.00 | 5.00 | 5.00 | 75.00 | 112.28 | 124.81 |
| 10-1 | 15.00 | 0.00 | 2.50 | 82.50 | 120.20 | 118.89 |
| 2-1 | 15.00 | 2.50 | 0.00 | 82.50 | ND | 122.30 |
| 14-1 | 15.00 | 2.50 | 5.00 | 77.50 | 118.34 | 123.90 |
| 12-1 | 11.25 | 5.00 | 0.00 | 83.75 | 109.11 | 117.51 |
| 13-1 | 11.25 | 0.00 | 0.00 | 88.75 | 116.99 | 118.60 |
| 5-2 | 15.00 | 5.00 | 5.00 | 75.00 | 112.02 | 124.60 |
| 3-1 | 7.50 | 5.00 | 0.00 | 87.50 | ND | 112.19 |
| 6-1 | 11.25 | 5.00 | 2.50 | 81.25 | 117.49 | 117.50 |
| 4-1 | 7.50 | 0.00 | 5.00 | 87.50 | 104.96 | 116.01 |
| 4-2 | 7.50 | 0.00 | 5.00 | 87.50 | ND | |
| 9-1 | 7.50 | 0.00 | 0.00 | 92.50 | 109.87 | 117.60 |
| 3-2 | 7.50 | 5.00 | 0.00 | 87.50 | ND | |

TABLE 2-continued

| Exp # | mol % TBMA | mol % EA | mol % MAH | mol % MMA | Tg (° C.) | Tg (° C.) |
|---|---|---|---|---|---|---|
| 8-1 | 11.25 | 2.50 | 5.00 | 81.25 | 116.99 | 124.66 |
| 1-2 | 7.50 | 5.00 | 5.00 | 82.50 | 117.18 | 113.02 |
| 2-2 | 15.00 | 2.50 | 0.00 | 82.50 | 106.31 | 122.30 |
| 11-1 | 15.00 | 5.00 | 2.50 | 77.50 | 118.60 | 125.80 |
| 15-1 | 7.50 | 2.50 | 0.00 | 90.00 | ND | 113.30 |

ND - not detected
Tg 1 - the glass transition taken prior to pyrolysis
Tg 2 - the glass transition taken subsequent to pyrolysis Analysis of the above data reveals that, although the overall correlation is not strong, the molar ratio of t-butyl methacrylate (t-BMA) has the greatest influence on the final Tg of the copolymer. For example, if the molar ratio of t-BMA is plotted versus the resulting glass transition temperature, one finds that the correlation coefficient, $R^2$, is 0.403. This contrasts with the correlation of maleic anhydride content in the copolymer, the $R^2$ value is only about 0.030. Although there are potentially multiple interactions within this copolymer system, it is clear that t-butyl methacrylate content is increasing the glass transition temperature of the polymer significantly.

EXAMPLE 3

This example illustrates the preparation of a high Tg acrylate ester polymer by suspension polymerization.

An amount of 1200 grams of distilled water was added to a 2-liter jacketed reaction vessel followed by 3.00 grams of polyvinyl alcohol (30% acetate). The water phase was heated at 65° C. until the polyvinyl alcohol had completely dissolved. An oil phase comprised of 80.0 grams of t-butyl methacrylate, 315.6 grams of methyl methacrylate, 9.39 grams of ethyl acrylate, 2.62 grams of normal dodecyl mercaptan as a chain transfer agent, and a blend of typical free radical initiators was added while the reaction vessel was stirred. The water and oil phases were then purged with helium for 3 minutes to remove oxygen. The reaction was allowed to continue for about 1 hour at 85° C. The reaction vessel was then cooled and the polymer beads were strained. These beads were washed several times with water and dried at 120° C. for 2 hours followed by 4 hours at 150° C. The resulting glass transition temperature of the polymer was measured to be 117.79° C. by differential scanning calorimetry (DSC) with a total residual monomer content of about 1.00 percent by weight.

EXAMPLE 4

This example illustrates the preparation of a high Tg acrylate ester polymer by bulk polymerization.

Methyl methacrylate monomer (625 grams, 6.25 moles) was added to a 1000 ml beaker that contained 160 grams t-butyl methacrylate (1.127 mol), 20.0 grams ethyl acrylate (0.20 mol). Eurcamide (0.925 grams) was added as a slip agent to assist with molding operations, and n-dodecyl mercaptan (2.82 grams) was added to control the molecular weight of the polymer. Initiators were added in quantities sufficient to allow polymerization to proceed to completion.

This monomer blend was added to an 8.5-inch by 11-inch bag made of nylon 6. After the monomer was added to the bag, a helium purge was introduced and allowed to bubble through the monomer for 2 minutes to eliminate any dissolved oxygen form the monomer. This bag was place into a laboratory oven and heated according to the following cycle: 65° C. for 8 hours, 75° C. for 2 hours, 85° C. for 3 hours, 95° C. for 2 hours, 105° C. for 2 hours, 115° C. for 2 hours, 125° C. for 3 hours about and 140° C. for 4 hours. The approximate total oven time from start to finish was 26 hours. This sample was ground into granular form and the glass transition temperature was found to be 113° C. as measured by DSC.

EXAMPLE 5

This example illustrates the preparation of a high Tg acrylate ester polymer by bulk polymerization.

An amount of 1200 grams (12 mol) of MMA monomer is added to a 2 liter vessel, followed by 320 grams (2.25 mol) of t-butyl methacrylate (t-BMA), followed by 15 grams (0.15 mol) of ethyl acrylate (EA). This blend is approximately 84 mol % MMA, 15 mol % t-BMA and 1 mol % EA. To this blend 0.35 percent by total weight n-dodecyl mercaptan is added as a means to control the molecular weight of the polymer. Appropriate amounts of decanoyl peroxide are added, the reaction mix purged with helium, the samples placed in small bags and subjected to an oven profile analogous to 65° C. for 15 hours, 75° C. for 3 hours, 85° C. for 1 hour and 5 hours at 95° C. followed by 4 hours at 130° C. The resulting polymer is ground, the volatiles removed and the Tg determined according to the procedure described above. The Tg of the copolymer so obtained is higher than that of a conventional PMMA.

EXAMPLE 6

This example illustrates the preparation of a high Tg acrylate ester polymer blend according to the invention.

A sample of a high heat methacrylate polymer, having a composition of 2.5 mol % maleic anhydride, 15.0 mol % t-butyl methacrylate, and 82.5 mol % MMA, was polymerized by conventional procedures and devolatilized by heating, under vacuum, for a period of 4 hours at 240° C. or by passing through a pelletizing extruder provided with heating zones ranging from about 150° C. to about 210° C. as well as appropriate vacuum regions for evacuating volatiles. This sample was mixed with a PMMA polymer (Optix®), produced by Plaskolite, inc, Columbus, Ohio) at about a 50 weight percent ratio and injection molded into conventional circular testing samples having a diameter of about 50 millimeters and a thickness of about 3 mm. The resulting test samples were clear with very light haze apparent. The Tg of the pure PMMA copolymer (5.0 mol % ethyl acrylate, and 95.0 mol % MMA) was measured (2nd heat history 10° C./min to 150° C. after heating to 150° C. and quenching to 30° C.) to be 108.1° C. The high Tg polymer in this example was measured to have a Tg of 129.5° C. The Tg of the resulting 50/50 blend was measured to be 119° C. to 120° C. using the same method. The single intermediate Tg indicates that the two polymers are indeed miscible, which is also evidenced by the clarity of the test disks.

EXAMPLE 7

This example illustrates the preparation and evaluation of a series of high Tg acrylate ester polymer blends according to the invention.

Another formulation of a high glass transition methacrylate polymer (2.0 mol % ethyl acrylate, 10.0 mol % t-butyl methacrylate and 88.0 mol % MMA) was polymerized and de-volatilized. The glass transition temperature of this copolymer measured 128° C. to 129° C. using a TA instruments differential scanning calorimeter (DSC) with the sample heated at 10° C./min on the $2^{nd}$ heat history as described above. This sample was blended in various ratios with three conventional PMMA copolymers, Optix® PL-25 (a copolymer comprising about 95 by weight of MMA and about 5% by weight of EA, produced by Plaskolite, Inc., Columbus, Ohio), IR-441®, and Optix® PL-30 (a copolymer comprising about 95 by weight of MMA and about 5% by weight of EA, produced by Plaskolite, Inc., Columbus, Ohio, having a slightly lower molecular weight than the Optix® PL-25 material, mixed with a conventional impact modifying resin), to determine how well this material acts as a performance modifier for these particular materials. The results of these experiments are reported in Table 3 below.

TABLE 3

| Base polymer | Weight % High Tg polymer | TG of blend | Percent light transmission | Percent haze | Yellowness index |
|---|---|---|---|---|---|
| PL-25 | 25 | 110° C. | 91.1 | 2.7 | 2.33 |
| PL-25 | 50 | 113° C. | 90.6 | 3.6 | 2.78 |
| PL-25 | 75 | 119° C. | 91.0 | 3.4 | 3.66 |
| PL-25 | 0.0 | 96° C. | 91.3 | 2.2 | 2.89 |
| PL-25 | 50 | 118° C. | 91.0 | 2.1 | 2.82 |
| PL-25 | 50 | 119° C. | 91.6 | 1.5 | 1.74 |
| — | 100 | 129° C. | 92.3 | 0.9 | 0.86 |
| IR-441 | 50 | 119° C. | 88.4 | 4.4 | 3.50 |
| PL-30/ PLDR | 50 | 118° C. | 89.2 | 5.4 | 2.50 |

The light transmission of the polymer samples was measured by conventional techniques. The percent haze is defined as {(direct light transmission—diffuse light transmission)/direct light transmission}×100%. The Yellowness Index is an arbitrary measure of the color of the sample as determined on a calorimeter, and is useful for comparison of the samples.

EXAMPLE 8

This example illustrates the preparation and evaluation of a blend of a high Tg acrylate ester polymer with a conventional impact modifier for acrylate ester polymers.

The high Tg methacrylate polymer prepared in Example 7 was hand blended at 50 weight percent with a traditional impact modifier (IR-441 from Mitsubishi Rayon Company of Japan) and injection molded so that the physical properties could be determined. It was immediately apparent that the molded ships were clear. The thermal properties of the molded chips were analyzed by DSC and exhibited a single Tg at 119° C. Both the clarity and the single Tg indicate that the high Tg polymer is miscible with conventional impact modifiers and that the high Tg polymer acts a thermal property modifier for the impact modifier. The heat distortion temperature (HDT) of this particular blend under load was also measured at 264 psi as per ASTM D-648. The measured value of the HDT was about 87.5° C. For comparison purposes, conventional PMMA blended at 40 weight percent with IR-441 exhibits an HDT of 70 to 75° C.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. An acrylate ester polymer blend comprising
   1) from about 95% by weight to about 50% by weight of a poly(methyl methacrylate) based polymer comprising
      (a) from about 80% by weight to 100% by weight of methyl methacrylate, and
      (b) from about 0% by weight to about 20 weight % of a copolymerizable free-radical polymerizable comonomer,
   2) from about 5% by weight to about 50% by weight of a copolymer prepared by polymerizing a monomer mixture comprising
      (a) from about 50% by weight to about 95% by weight of methyl methacrylate,
      (b) from about 5% by weight to about 30% by weight of t-butyl methacrylate, and
      (c) from about 0% by weight to about 20% by weight of a copolymerizable lower (meth)acrylate ester monomer; and
      preparing a pyrolyzed copolymer by pyrolyzing the resulting copolymer at a temperature of from about 150° C. to about 320° C. for a period of from about 10 seconds to about 10 hours, said pyrolyzed copolymer having a refractive index compatible with that of said poly(methyl methacrylate based copolymer;
   3) from about 0% by weight to about 50% by weight of an refractive index compatible impact modifier polymer material.

2. The copolymer blend of claim 1, wherein said monomer mixture comprises from about 7.5% by weight to about 25% by weight of t-butyl methacrylate.

3. The copolymer blend of claim 1, wherein said monomer mixture comprises from about 7.5% by weight to about 20% by weight of t-butyl methacrylate.

4. The copolymer blend of claim 1, wherein said monomer mixture comprises from about 10% by weight to about 15% by weight of t-butyl methacrylate.

5. An acrylate ester polymer blend consisting essentially of
   1) from about 95% by weight to about 50% by weight of a poly(methyl methacrylate) based polymer comprising
      (a) from about 80% by weight to 100% by weight of methyl methacrylate, and
      (b) from about 0% by weight to about 20 weight % of a copolymerizable free-radical polymerizable comonomer,
   2) from about 5% by weight to about 50% by weight of a copolymer prepared by polymerizing a monomer mixture consisting essentially of
      (a) from about 50% by weight to about 95% by weight of methyl methacrylate,
      (b) from about 5% by weight to about 30% by weight of t-butyl methacrylate, and
      (c) from about 0% by weight to about 20% by weight of a copolymerizable lower (meth)acrylate ester monomer; and
      preparing a pyrolyzed copolymer by pyrolyzing the resulting copolymer at a temperature of from about 150° C. to about 320° C. for a period of from about 10 seconds to about 10 hours, said pyrolyzed copolymer having a refractive index compatible with that of said poly(methyl methacrylate based copolymer;
   3) from about 0% by weight to about 50% by weight of an refractive index compatible impact modifier polymer material.

6. The copolymer blend of claim 5, wherein said monomer mixture contains from about 7.5% by weight to about 25% by weight of t-butyl methacrylate.

7. The copolymer blend of claim 1, wherein said monomer mixture contains from about 7.5% by weight to about 20% by weight of t-butyl methacrylate.

8. The copolymer blend of claim 1, wherein said monomer mixture contains from about 10% by weight to about 15% by weight of t-butyl methacrylate.

9. An acrylate ester polymer blend consisting essentially of
   1) from about 95% by weight to about 50% by weight of a poly(methyl methacrylate) based polymer comprising
      (a) from about 80% by weight to 100% by weight of methyl methacrylate, and
      (b) from about 0% by weight to about 20 weight % of a copolymerizable free-radical polymerizable comonomer,
   2) from about 5% by weight to about 50% by weight of a copolymer consisting essentially of the pyrolysis product of a copolymer consisting essentially of
      (a) from about 50% by weight to about 95% by weight of methyl methacrylate,
      (b) from about 5% by weight to about 30% by weight of t-butyl methacrylate, and
      (c) from about 0% by weight to about 20% by weight of a copolymerizable lower (meth)acrylate ester monomer; said pyrolysis product copolymer having a refractive index compatible with that of said poly (methyl methacrylate based copolymer;
   3) from about 0% by weight to about 50% by weight of an refractive index compatible impact modifier polymer material.

10. The copolymer blend of claim 9, wherein said monomer mixture contains from about 7.5% by weight to about 25% by weight of t-butyl methacrylate.

11. The copolymer blend of claim 9, wherein said monomer mixture contains from about 7.5% by weight to about 20% by weight of t-butyl methacrylate.

12. The copolymer blend of claim 9, wherein said monomer mixture contains from about 10% by weight to about 15% by weight of t-butyl methacrylate.

13. A method for producing a methacrylate copolymer comprising
   1) providing a copolymer comprising
      (a) from about 50% by weight to about 95% by weight of methyl methacrylate,
      (b) from about 5% by weight to about 30% by weight of t-butyl methacrylate, and
      (c) from about 0% by weight to about 20% by weight of a copolymerizable lower (meth)acrylate ester monomer;
   2) preparing a pyrolyzed copolymer by pyrolyzing said copolymer prepared in step 1) by passing it through an extruder and heating it to a temperature in a range from about 150° C. to about 320° C. for a period of time sufficient to pyrolyze at least some of said t-butyl methacrylate in said copolymer prepared in Step 1).

14. The method of claim 13 wherein said pyrolyzing is continued until no more than 1.5% by weight of residual isobutylene remains in said pyrolyzed copolymer.

* * * * *